(12) United States Patent
Clancy, III et al.

(10) Patent No.: US 6,916,045 B2
(45) Date of Patent: Jul. 12, 2005

(54) SEAT BELT RETRACTOR TORSION ROD ACTIVITY SENSOR

(75) Inventors: Edward W. Clancy, III, Commerce Township, MI (US); Gerald J. Keller, Shelby Township, MI (US); Brian Blackburn, Rochester, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 32 days.

(21) Appl. No.: 10/643,865

(22) Filed: Aug. 20, 2003

(65) Prior Publication Data

US 2005/0040631 A1 Feb. 24, 2005

(51) Int. Cl.[7] .............................................. B60R 22/28

(52) U.S. Cl. ..................... 280/805; 280/807; 242/379.1

(58) Field of Search ............................... 280/803, 805, 280/806, 807, 735; 242/379.1, 384.4

(56) References Cited

U.S. PATENT DOCUMENTS

| | | | |
|---|---|---|---|
| 3,741,494 A | | 6/1973 | Fiala |
| 5,571,253 A | * | 11/1996 | Blackburn et al. .......... 180/282 |
| 5,739,757 A | | 4/1998 | Gioutsos |
| 5,747,696 A | | 5/1998 | Kwun et al. |
| 5,779,178 A | * | 7/1998 | McCarty ..................... 242/384 |
| 5,799,893 A | | 9/1998 | Miller, III et al. |
| 6,012,667 A | | 1/2000 | Clancy, III et al. |
| 6,343,759 B1 | * | 2/2002 | Specht ..................... 242/375.1 |
| 6,439,494 B1 | * | 8/2002 | Specht et al. ............. 242/379.1 |
| 6,443,381 B2 | | 9/2002 | Bell et al. |
| 6,450,435 B2 | | 9/2002 | Junker et al. |
| 6,755,369 B2 | * | 6/2004 | Holbein ..................... 242/384 |

OTHER PUBLICATIONS

"Vehicle Crash Testing using the LogBook/300" Application Note #38, Iotech, Inc.
Hegeor Kwun, "Back in StyleL Magnetostrictive Sensors", printout from SWRI website, originally in Sep. 1991 issue of Technology Today.
Dave Nyce, "Magnetostrictive Linear Position Sensors", printout from Sensor Magazine, Nov. 1999.
Jesse L. J. Russel, "Magnetostrictive Position Sensor Enter the Automotive Market", printout from Sensor Magazine, Nov., 2002.
Kwun & Kim, "Develoment of Magnetostrictive Sensor Technology for Plate Inspection, 15–9077", website www.swri.edu/3pubs/IRD1999/15907799.
"Non–contact ultrasonic sensor and actuator using magnetostriction effect", website printout www.idealab.snu.ac.kr/research/sensor/magnetostriction.
"RDP Electronics & MTS Temposonics Transducers", website printout, www.rpdelectronics.com/displacement/magneto/principle.

* cited by examiner

*Primary Examiner*—Paul N. Dickson
*Assistant Examiner*—Toan To
(74) *Attorney, Agent, or Firm*—Lonnie R. Drayer

(57) ABSTRACT

A seat belt load limiter employs a magnetostrictive sensor to detect the elastic loading and plastic deformation of a torsion rod forming part of a seat belt retractor. A magnet and a coil are placed about or adjacent to the torsion rod. When the torsion rod undergoes elastic or plastic strain, an electrical voltage is induced in the coil which is used to detect elastic or plastic strain of the torsion rod. A vehicle safety system uses the output of the magnetostrictive sensor to inform the vehicle operator when the seat belt load limiter is in need of replacement. The output of the magnetostrictive sensor as processed by the vehicle safety system can also be used to detect a situation where the seat occupant is not restrained by the seat belt and to make an airbag deployment decision.

13 Claims, 2 Drawing Sheets

SEAT BELT RETRACTOR TORSION ROD ACTIVITY SENSOR

FIELD OF THE INVENTION

The present invention relates to seat belt retractors with load limiting structures and sensors for monitoring their operation.

BACKGROUND OF THE INVENTION

The benefit of seat belts in preventing or limiting injury during a motor vehicle crash is substantially enhanced if a system to detect the onset of a crash is used in combination with a device known as a seat belt retractor which tightens the seat belt in response to the detection of a crash of a selected severity. The reeling of the belt onto the belt spool is termed "retraction," while the unwinding of belt is known as "protraction." Further benefit is derived from using a seat belt spool which incorporates a load limiting torsion rod, the load limiting torsion rod allows seat belt webbing to be drawn from the seat belt spool under load to absorb energy from a vehicle occupant restrained by the seat belt. The load limiting mechanism is brought into operation by a level of load applied to the belt, or the rate at which the seat belt is protracted. Typically, the load limiting mechanisms operate by locking the normal mechanisms that allow the seat belt to be protracted from a seat belt take-up spool. Locking of the protraction mechanism where large loads are applied to the seat belt results in shearing a shaft which connects the seat belt spool to a seat belt bracket which is in turn anchored to the structure of the vehicle, or a vehicle seat. Seat belts that incorporate retractors and load limiters are used in combination with airbags to further prevent or limit injury during a motor vehicle crash. Ideally the seat belt restrains the occupant during the initial part of the crash until the airbags are deployed.

After airbag deployment, the vehicle occupants engage one or more airbags and the restraining effect of the seat belts becomes complementary to the restraining effect of the airbags. Load limiting mechanisms typically take the form of a shaft which is allowed to plastically deform under a torsional shear load such as the system described in U.S. Pat. No. 6,0012,667 which is incorporated herein by reference. Other types of energy absorbing mechanisms are also known and generally use the plastic deformation of a structure to absorb energy.

In a less severe crash, the airbags typically will not deploy, as deployment of airbags means the airbags must be replaced at some considerable expense and there is some risk associated with airbag deployment. The safety system in the motor vehicle determines whether or not to deploy an airbag or other safety system feature operates according to various algorithms based on sensor inputs to determine as well as possible whether airbag deployment would be beneficial or not. If an airbag is not deployed, generally no maintenance is required, and the unit does not have to be replaced. On the other hand, if the airbag has deployed it is in obvious need of replacement.

Similar to airbags deployment, seat belt retractor deployment is controlled by the safety system in the motor vehicle and normally results in the actuation of a pyrotechnic mechanism the operation of which is more or less apparent. However, the seat belt spool on which the seat belt webbing is wound normally locks in response to a relatively low level of deceleration that may occur on an almost daily basis for a typical motor vehicle. However, once the seat belt spool is locked, significant further payout of the seat belt results in shearing of the load limiting torsion rod. After a crash, the vehicle is normally repaired and the airbags, if deployed, are replaced, but the need for replacing the load limiting torsion rods which may have undergone plastic yielding is less obvious as the seat belt and the seat belt spool and the retracting mechanisms may remain functional.

What is needed is a method and instrumentation for monitoring the operation and the loads experienced by the load limiting torsion rod, so that the safety system can determine whether the load limiting torsion rods need to be replaced and inform the vehicle operator when a need for replacement has been identified. Monitoring the operation of the load limiting torsion rod would also supply additional data to the safety system which could be considered by the safety system logic in determining the timing and force with which other safety systems such as airbags are deployed.

A further function which such a sensor could provide would be to provide data about whether a passenger is properly belted. Airbag deployment strategies can be varied depending on whether or not a passenger is restrained by seat belts. However, using such a deployment strategy requires a way of detecting that the seat belt is not only fastened, but also fastened about the passenger. If the seat belt is fastened but not about the occupant the motor vehicle safety system may not respond correctly unless a way can be found to determine that although the seat belt is fastened it is not operating to restrain an occupant.

SUMMARY OF THE INVENTION

The seat belt load limiter of this invention employs a magnetostrictive sensor that detects the elastic loading and plastic deformation of a torsion rod forming part of a seat belt retractor. In the seat belt load limiter a magnet and a coil are placed about or adjacent to a load limiting torsion rod forming part of a seat belt retractor. When the torsion rod undergoes the elastic or plastic strain, an electrical voltage is induced in the coil that is used to detect elastic or plastic strain of the torsion rod. Magnetostrictive sensors have the potential of being reliable and of operating over a large temperature range making them suitable for use in motor vehicle applications.

It is a feature of the present invention to provide a seat belt load limiter incorporating a sensor based on the magnetostrictive or inverse magnetostrictive principle that can detect strain in a load limiting element.

It is another feature of the present invention to provide a seat belt load limiter incorporating a sensor based on the magnetostrictive or inverse magnetostrictive principle that can be used by the motor vehicle safety system to determine that a seat belt is properly fastened about a vehicle occupant.

It is a further feature of the present invention to provide a seat belt load limiter incorporating a sensor based on the magnetostrictive or inverse magnetostrictive principle, wherein the output of the sensor is used to determine whether the seat belt load limiter must be replaced after a crash or other incident.

It is yet another feature of the present invention to provide a seat belt load limiter which can provide black box data by means of a magnetostrictive or inverse magnetostrictive principle for analysis after a motor vehicle crash.

Further features and advantages of the invention will be apparent from the following detailed description when taken in conjunction with the accompanying drawings.

DETAILED DESCRIPTION OF THE INVENTION

Figure 1:
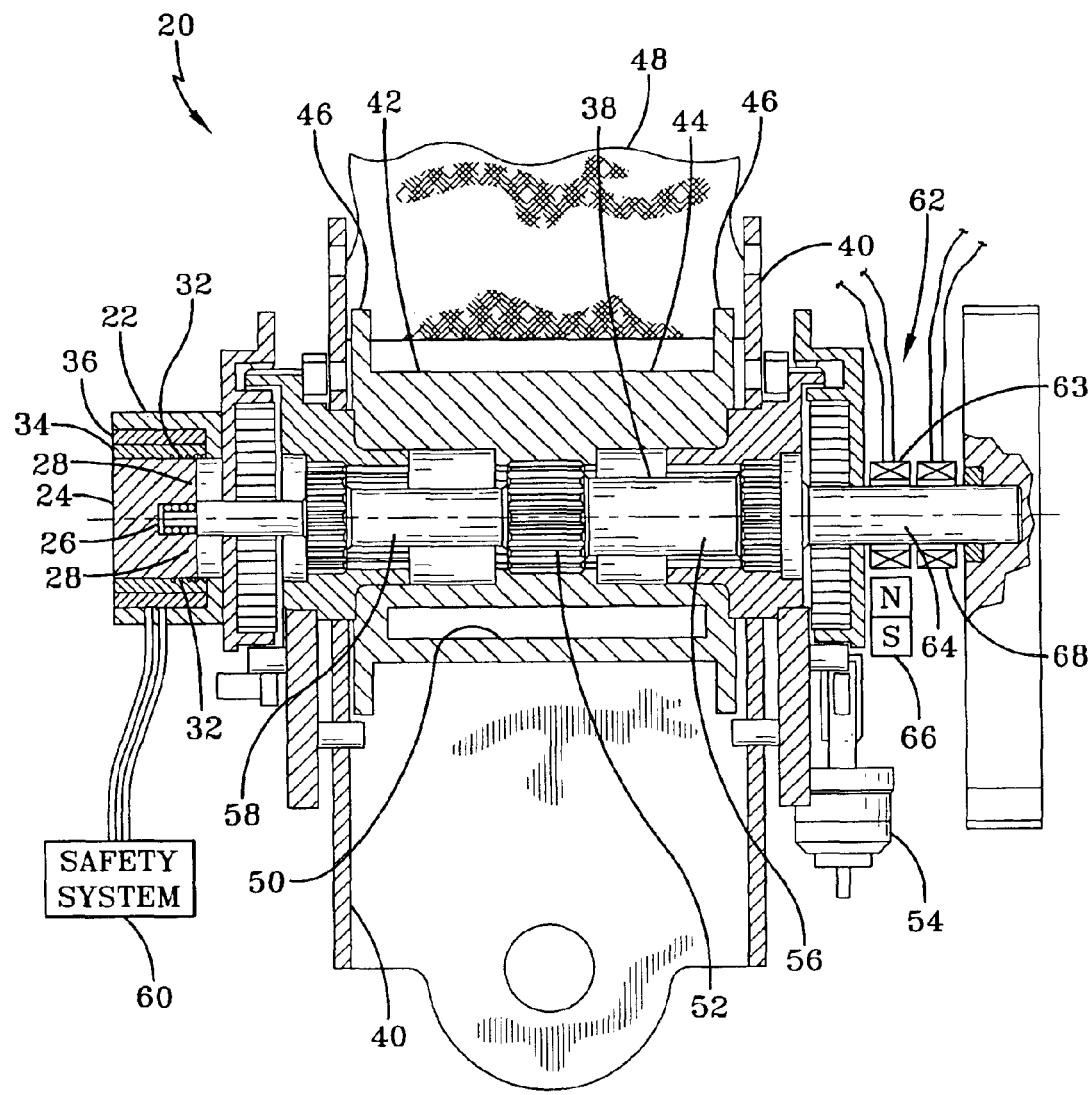
FIG. 1 is a cross sectional view of a seat belt retractor of this invention incorporating a stand off passive magnetostrictive sensor, and in the alternative a shaft encircling passive sensor or an active magnetostrictive sensor.
Figure 2:
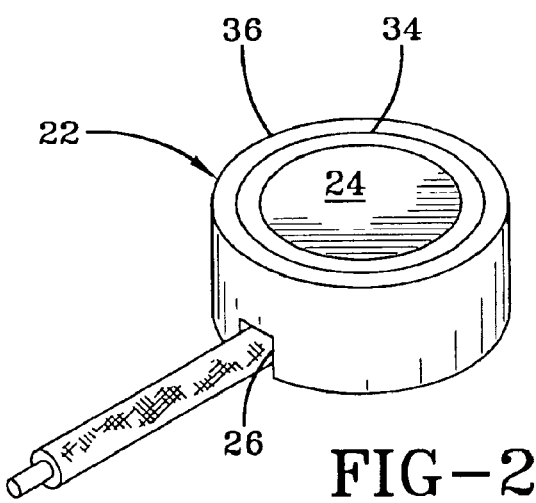
FIG. 2 is an isometric view of the magnetostrictive sensor of the device of FIG. 1.
Figure 3:
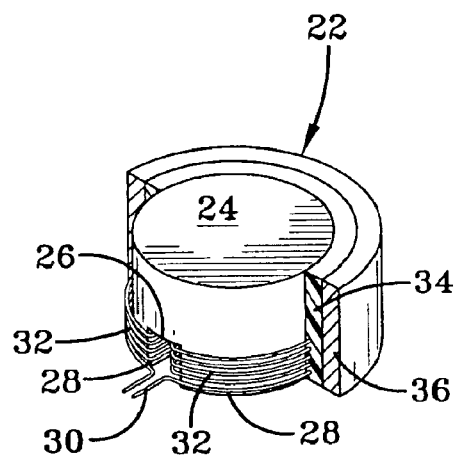
FIG. 3 is an isometric view partly cutaway of the magnetostrictive sensor of FIG. 2.

Referring more particularly to FIGS. 1–4, wherein like numbers refer to similar parts, a seat belt retractor 20 incorporating a load limiter in the from of a yielding torsion rod 38 is shown FIG. 1. The seat belt retractor 20 is similar to the seat belt retractor shown in U.S. Pat. No. 6,012,667, however the seat belt retractor 20 has been modified by the addition of a magnetostrictive sensor 22. The magnetostrictive sensor 22 is shown in more detail in FIGS. 2 and 3. The magnetostrictive sensor 22 has a cylindrical biasing magnet 24 which has a slot 26 which extends through the biasing magnet 24 and which forms two legs 28 about which a wire 30 is wound to form two coils 32. The biasing magnet 24 and the wire 30 forming the coils 32 are surrounded by an epoxy layer 34 which in turn is surrounded by a stainless steel case 36.

The magnetostrictive effect was first reported by Joule in 1847. The magnetostrictive effect describes a small change in physical dimensions of ferromagnetic materials in the presence of a magnetic field. The opposite effect, known as the inverse magnetostrictive effect, results in the generation of an electromagnetic field when a ferromagnetic material undergoes strain. Passive sensors using the inverse magnetostrictive effect may be nothing more than one or more coils 32, 63 and a biasing magnet 24, 66 placed in the vicinity of a ferromagnetic material, such as a load limiting torsion rod 38 such as shown in FIG. 1. When the ferromagnetic material undergoes strain, the generated electromagnetic field produces a voltage that is detected coil 32 or 63.

Magnetostrictive sensors have the advantage that the sensor does not have to be in contact with the ferromagnetic material in which strain is detected. This is important in motor vehicle applications where the sensor must operate reliably over long periods of time in the severe environment normally experienced by the interior of a motor vehicle. If the sensor can be mechanically attached in the near vicinity of the torsion rod 38, its functionality can be assured. A sensor such as a strain gauge or a piezoelectric sensor that must be in contact the structure undergoing the strain, would be less likely to remain reliable in the automotive environment.

Figure 4:
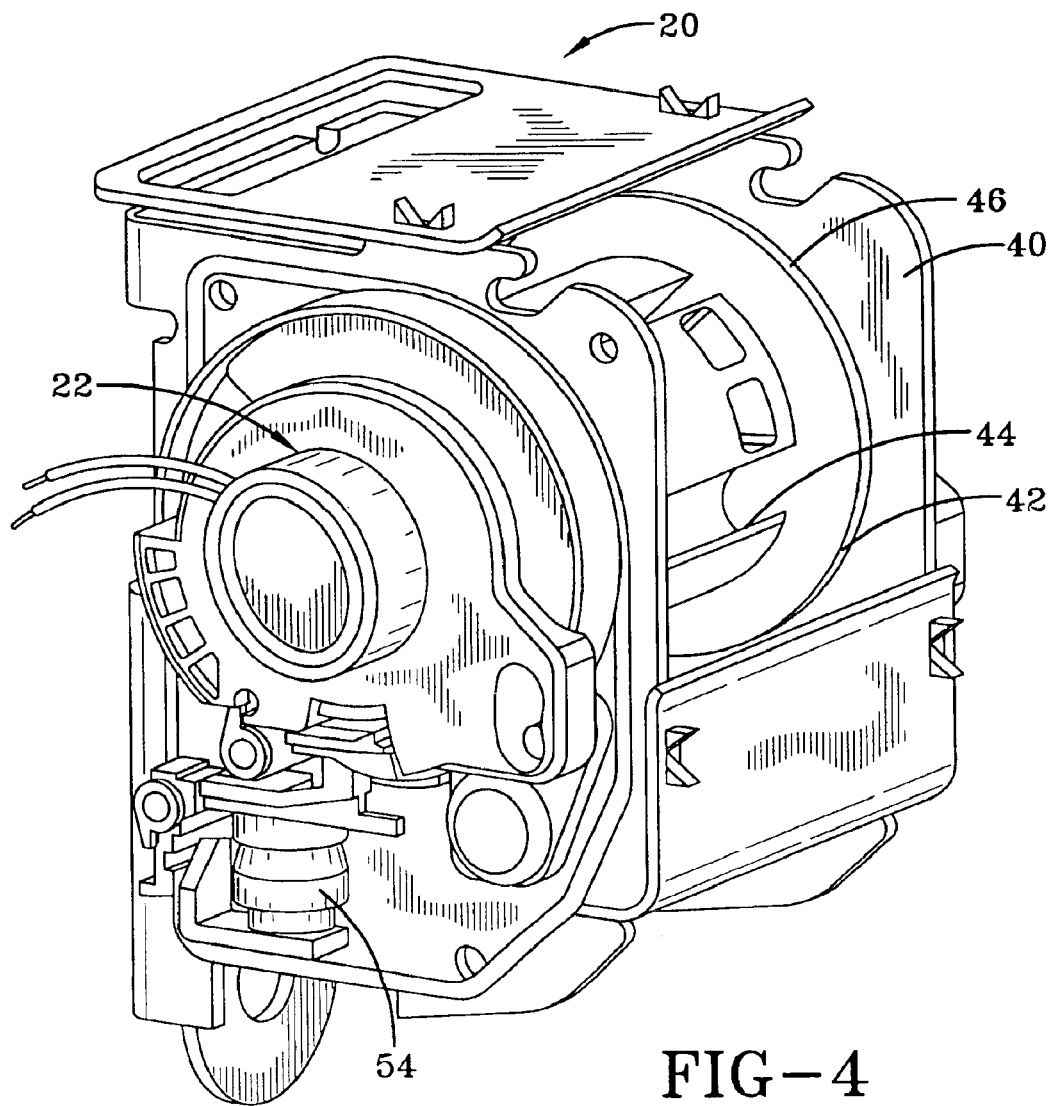
FIG. 4 is an isometric view of the seat belt retractor of FIG. 1 showing the magnetostrictive sensor.

The seat belt retractor, as shown in FIGS. 1 and 4, has a U-shaped frame 40. A spool 42 is rotatably supported on the frame 40. The spool 42 includes a center portion 44 and flanges 46. A length of seat belt webbing 48 is wound about the central portion 44 of the spool 42. An inner end of the seat belt is received within a slot 50 in a known manner.

The spool 42 is connected to the central torsion rod 38 which has a spline arrangement 52 as explained more fully in U.S. Pat. No. 6,012,667 so that when the torsion rod is locked in place, by, for example, an inertial element 54 during a crash, the seat belt webbing 48 can only be unwound or protracted by a plastic torsional yielding of the torsion rod 38. The torsion rod 38, as shown in FIG. 1, has a first part 56 that can be locked by the inertial element 54 and a second part 58 that can be locked by a squib initiated actuator (not shown). Thus the amount of resistance to protraction which the torsion rod 38 produces can be varied by initiation of the squib.

The elastic or plastic deformation of the torsion rod 38 can be monitored by the magnetostrictive sensor 22 that produces a voltage in response to the deformation of the torsion rod 38. Data collection can be initiated by actuation of the inertial element 54, detection of spool rotation, detection of torsion rod rotation, or the magnitude of the signal received from the sensor 22.

The output of the magnetostrictive sensor 22 is supplied to a safety system 60. The safety system 60 can process the output of the sensor 22 to determine whether plastic deformation has occurred, and the amount and rate at which elastic or plastic strain is taking place. This information can be used to increase the resistance of the torsion rod 38 to the protrusion of the seat belt by, for instance, initiating the squib initiated actuator (not shown) which will engage the second portion 58 of the torsion rod 38. Information also can be processed and stored by the vehicle safety system 60 so as to alert the occupant that the seat belt retractors have plastically yielded and therefore need to be replaced. By monitoring and storing the output of the sensor 22 with respect to time it may be possible to determine how many rotations of the seat belt spool 42 occur during a crash. The number of rotations of the seat belt spool is a direct indicator of the amount of seat belt protracted during the crash.

The total amount of seat belt protracted during a crash can be used, after the crash event, to studying the magnitude of the crash and the operation of the entire safety system of the vehicle, so that future safety systems may be improved. Thus various parameters output by the sensor 22 can be saved as part of data recorded by a black box/flight recorder which gathers data to improve engineering understanding of actual crash events.

Information gathered from the magnetostrictive sensor can also be used to determine if the seat belt is fastened, in combination with other sensors such as a seat weight sensor that determines that a seat is occupied. Very early in a crash the torsion rod 38 should be elastically strained by the load of the seat occupant against the seat belt. In the event that the seat belt does not indicate such elastic strain, vehicle safety system logic may be able to determine the presence of an occupant who is not restrained by a seat belt even when the seat belt has been fastened. A fastened seat belt that does not restrain the seat occupant occurs when the seat belt has been fastened behind the occupant. Information that a seat occupant is unrestrained can be used to trigger early deployment of an airbag, so as to maximize the benefit of the airbag in the situation of an unbelted seat occupant. If the airbag is of the two stage or variable deployment pressure type, the airbag deployment itself can be varied based on information received from the magnetostrictive sensor 22 as processed by the vehicle safety system.

An alternative embodiment magnetostrictive sensor 62 consists of a coil 63 positioned around a stub shaft 64 extending from the torsion rod 38. A permanent magnet 66 is positioned adjacent the coil 63 to increase the signal produced by the sensor 62.

A further embodiment uses an arrangement of two coils, one passive 63, and one active 68, about a ferromagnetic core which can be the stub shaft 64 or can be a separate element as illustrated and described in U.S. Pat. No. 5,739,757 the disclosure of which is incorporated by reference herein. The active coil 68 generates an oscillating magnetic field that produces oscillating stress, or vibrations in a ferromagnetic material 64, and the passive coil 63 detects the magnetic field produced by the oscillating stress in the ferromagnetic core. Strains in the ferromagnetic material produced by the first coil are modulated by the stress in the ferromagnetic torsion rod 38 and this modulation can be detected by the passive coil 63.

It should be understood that the inverse magnetostrictive effect depends on employing a ferromagnetic material however the torsion rod 38 could be made primarily of another material having only a part of the rod such as a coating or sleeve constructed of ferromagnetic material which would give rise to electromagnetic waves when the rod and coating or sleeve are placed under strain.

It is understood that the invention is not limited to the particular construction and arrangement of parts herein illustrated and described, but embraces all such modified forms thereof as come within the scope of the following claims.

We claim:

1. An apparatus for monitoring the protraction of a seat belt from a seat belt retractor under crash induced loads, the apparatus comprising:
   a seat belt retractor having at least one deformable structure that deforms in response to protraction of the seat belt, with the at least one deformable structure being at least in part ferromagnetic;
   a magnetostrictive sensor positioned to receive electromagnetic signals from the at least one deformable structure when said at least one deformable structure undergoes strain; and
   a motor vehicle safety system in signal receiving relation to the magnetostrictive sensor.

2. The apparatus of claim 1 wherein the at least one deformable structure is a torsion rod which defines an axis and to which a seat belt webbing spool is mounted.

3. The apparatus of claim 2 wherein the magnetostrictive sensor is positioned axially spaced from the torsion rod.

4. The apparatus of claim 2 wherein the magnetostrictive sensor is a coil placed around a portion of the torsion rod.

5. The apparatus of claim 1 wherein the magnetostrictive sensor has a sensing coil and a permanent magnet so that the magnetostrictive sensor is of the passive type.

6. The apparatus of claim 1 wherein the magnetostrictive sensor has a first active coil and a second passive coil that are both positioned about a ferromagnetic element.

7. The apparatus of claim 6 wherein the ferromagnetic element is a torsion rod which forms the at least one deformable structure.

8. An apparatus for monitoring the strain in a load limiting structure which absorbs energy as a seat belt is protracted, the apparatus comprising:
   at least one deformable structure which deforms in response to protraction of the seat belt, wherein the at least one deformable structure is at least in part ferromagnetic;
   a magnetostrictive sensor positioned to receive electromagnetic signals from the at least one deformable structure when said at least one deformable structure undergoes strain;
   a motor vehicle safety system in signal receiving relation to the magnetostrictive sensor.

9. The apparatus of claim 8 wherein the at least one deformable structure is a torsion rod to which is mounted a spool upon which a quantity of seat belt webbing is wound.

10. The apparatus of claim 9 wherein the magnetostrictive sensor is a coil placed around a portion of the torsion rod.

11. The apparatus of claim 8 wherein the magnetostrictive sensor is positioned axially spaced from the torsion rod.

12. The apparatus of claim 8 wherein the magnetostrictive sensor has a sensing coil and permanent magnet and is of the passive type.

13. The apparatus of claim 8 wherein the magnetostrictive sensor has a first active coil, and a second passive coil which are both positioned about the at least one deformable structure.

* * * * *